US006961658B2

(12) United States Patent
Ohler

(10) Patent No.: US 6,961,658 B2
(45) Date of Patent: Nov. 1, 2005

(54) METHOD, SYSTEM AND ARTICLE OF MANUFACTURE FOR IDENTIFYING REGULARLY TRAVELED ROUTES

(75) Inventor: Jean K. Ohler, Bloomingdale, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/436,829

(22) Filed: May 13, 2003

(65) Prior Publication Data

US 2003/0195701 A1 Oct. 16, 2003

Related U.S. Application Data

(63) Continuation of application No. 09/703,785, filed on Nov. 1, 2000, now Pat. No. 6,591,188.

(51) Int. Cl.$^7$ ................................................ G06F 7/00
(52) U.S. Cl. ...................... 701/209; 701/201; 701/202; 701/208; 340/988; 340/995.1; 340/995.13; 340/995.19; 340/995.24; 705/13; 705/14
(58) Field of Search ................................. 701/201, 202, 701/208, 209; 340/988, 995.1, 995.13, 995.19, 995.24; 705/5, 13, 14, 26

(56) References Cited

U.S. PATENT DOCUMENTS

| | | | | |
|---|---|---|---|---|
| 5,383,128 A | | 1/1995 | Nishida et al. ............. 340/990 |
| 5,568,390 A | | 10/1996 | Hirota et al. ............... 340/990 |
| 5,664,948 A | * | 9/1997 | Dimitriadis et al. ..... 434/307 R |
| 5,802,492 A | | 9/1998 | DeLorme et al. .......... 340/990 |
| 5,819,200 A | | 10/1998 | Tamai et al. ................ 340/990 |
| 5,905,451 A | | 5/1999 | Sakashita .................... 340/998 |
| 5,919,246 A | | 7/1999 | Waizmann et al. ......... 701/209 |
| 5,978,730 A | | 11/1999 | Poppen et al. .............. 370/351 |
| 5,987,375 A | | 11/1999 | Tamai ......................... 340/990 |
| 6,073,075 A | * | 6/2000 | Kondou et al. ............. 701/203 |
| 6,122,520 A | | 9/2000 | Want et al. .................. 455/456 |
| 6,125,323 A | | 9/2000 | Nimura et al. .............. 701/207 |
| 6,199,045 B1 | | 3/2001 | Giniger et al. .................. 705/1 |
| 6,259,381 B1 | | 7/2001 | Small .......................... 340/988 |
| 6,259,987 B1 | | 7/2001 | Ceylan et al. .............. 701/200 |
| 6,308,133 B1 | | 10/2001 | Loffert et al. ............... 340/995 |
| 6,329,932 B1 | * | 12/2001 | Fastenrath .................. 340/934 |
| 6,334,089 B2 | | 12/2001 | Hessing ...................... 342/463 |
| 6,353,398 B1 | | 3/2002 | Amin et al. ................. 340/995 |
| 6,360,167 B1 | | 3/2002 | Millington et al. ......... 701/211 |
| 6,427,118 B1 | * | 7/2002 | Suzuki ........................ 701/209 |
| 6,434,482 B1 | * | 8/2002 | Oshida et al. .............. 701/209 |

FOREIGN PATENT DOCUMENTS

WO        WO 00/49530        8/2000        ........... G06F/17/30

* cited by examiner

*Primary Examiner*—Thomas G. Black
*Assistant Examiner*—Eric M. Gibson
(74) *Attorney, Agent, or Firm*—Jon D. Shutter; Frank J. Kozak; Lawrence M. Kaplan

(57) ABSTRACT

An in-vehicle navigation system includes a receiver for receiving real-time traffic information (RTTI), a database for storing routine trip information, and a processor for running a regular route application. The regular route application includes a learning mode program and an operational mode program. The learning mode program records information regarding trips regularly taken by a vehicle and populates the database with records of routine trip information. The recorded trip information can include driver identifiers, trip departure times, origin points, destination points, dates of travel, days of travel, and route data. When the vehicle begins a new trip, the operational mode program determines whether the vehicle is engaging in a routine trip. This is accomplished by comparing current vehicle location or departure time information to routine trip information in the database. If the vehicle is starting a routine trip, the operational mode program retrieves from the database trip information stored in a trip record associated with the routine trip, accesses RTTI corresponding to the trip information, and notifies an end user about traffic conditions indicated by the RTTI.

24 Claims, 5 Drawing Sheets

METHOD, SYSTEM AND ARTICLE OF MANUFACTURE FOR IDENTIFYING REGULARLY TRAVELED ROUTES

REFERENCE TO RELATED APPLICATION

The present application is a continuation of Ser. No. 09/703,785 filed Nov. 1, 2000, now U.S. Pat. No. 6,591,188, the entire disclosure of which is incorporated herein by reference.

TECHNICAL FIELD OF THE INVENTION

The present invention relates generally to vehicle navigation systems, and in particular to a vehicle navigation system that is capable of identifying regularly traveled routes and use this capability to provide additional features.

BACKGROUND OF THE INVENTION

Vehicle navigation systems have become available in a variety of forms and provide for a variety of useful features. Some vehicle navigation systems are able to determine an optimum route to travel by roads between locations. Using input from an end user, and optionally from equipment that can determine one's physical location (such as a GPS system), a vehicle navigation system can examine various routes between the end user's present location and a specified destination location to determine an optimum route to travel. The vehicle navigation system may then provide the end user with information about the optimum route in the form of instructions that identify the maneuvers required to be taken by the end user to travel from the starting location to the destination location. The instructions may take the form of audio instructions that are provided along the way as the end user is traveling the route. Some navigation systems are able to show detailed maps on computer displays outlining routes to destinations, the types of maneuvers to be taken at various locations along the routes, locations of certain types of features, and so on.

Although vehicle navigation systems currently provide many useful features, there is opportunity for enhancing their capabilities. For example, features such as map display, route calculation, and direction instruction are particularly useful in scenarios where the end user is not entirely familiar with a particular geographic area in which he/she is traveling. In scenarios where the end user is traveling along familiar routes, there is a need to extend the functionality of navigation systems to enhance the overall driving experience. In these situations, end users may be provided with other useful features. Accordingly, there exists a need for a navigation system capable of identifying routes routinely traveled by an end user and providing additional useful features based on this information.

DETAILED DESCRIPTION OF THE PRESENTLY PREFERRED EMBODIMENT(S)

Figure 1:
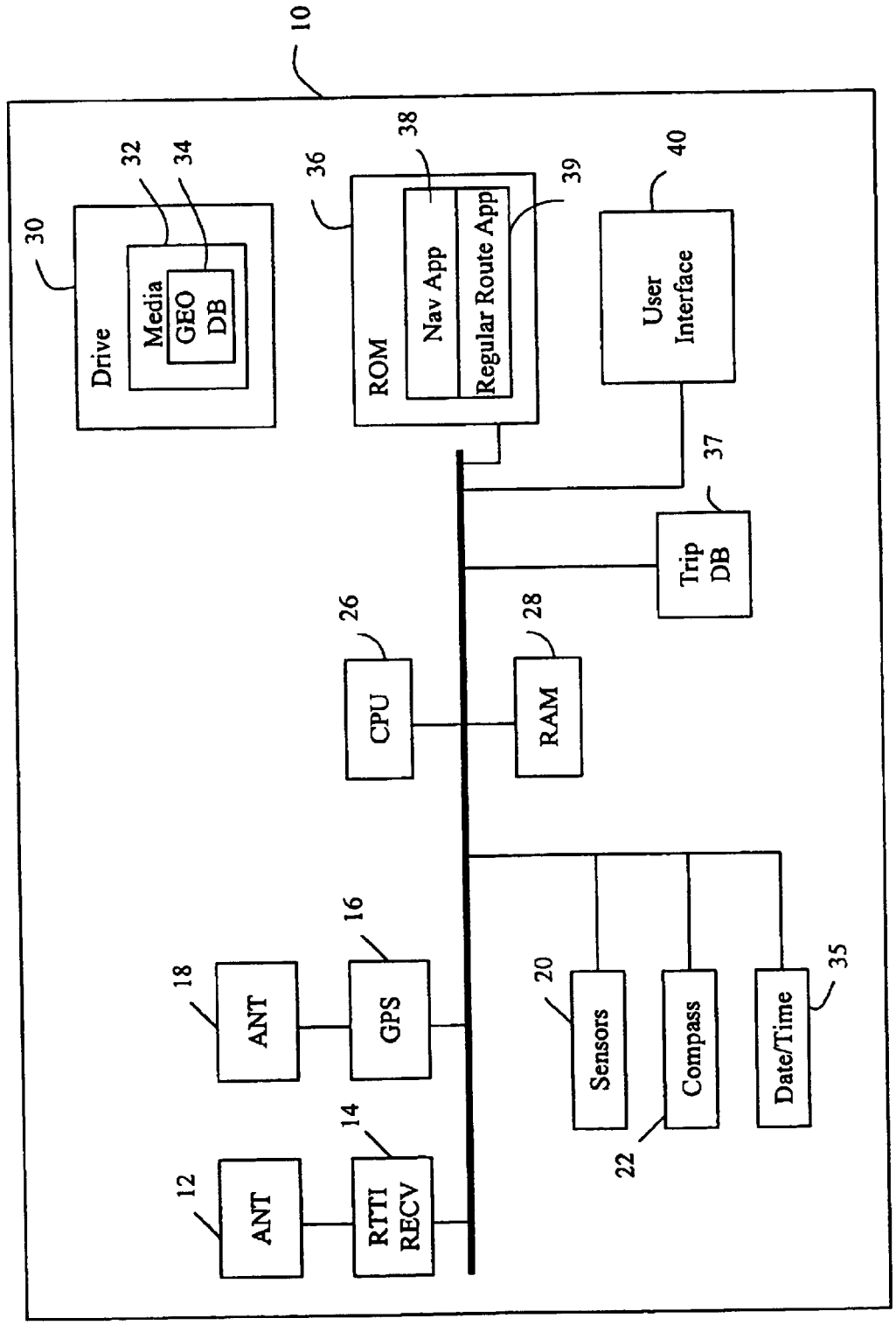
FIG. 1 is a block diagram illustrating an exemplary navigation system in accordance with an embodiment of the present invention.

Referring now to the drawings, and particularly to FIG. 1, there is illustrated an exemplary navigation system 10 in accordance with an embodiment of the present invention. The navigation system 10 includes a combination of hardware and software components that can be implemented in various different kinds of environments or on different platforms. For example, the navigation system 10 may be located in an automobile, truck, or other land-based vehicle. In an exemplary embodiment, the navigation system 10 includes appropriate components which may include a real-time traffic information (RTTI) receiver 14, an RTTI antenna, 14, a global positioning system (GPS) 16, a GPS antenna 18, a date/time clock 35 for providing current time and date information, one or more sensors 20 coupled to sense the vehicle speed, operational state and distance traveled, and a compass 22 to sense the vehicle direction. In addition, the navigation system can include a central processing unit (CPU) 26 and memory 28, a trip database (DB) 37, as well as other appropriate hardware.

The date/time clock 35 can be implemented locally in the navigation system 10; alternatively, current date and time information can be obtained from external sources, such as GPS or cellular systems.

The RTTI receiver 14 and antenna 12 allow the navigation system 10 to retrieve real-time traffic information from available sources. The receiver 14 can include any means for receiving the information, such as a conventional radio frequency (RF) interface to a wireless data network, or a dedicated wireless link to a real-time traffic data gathering system.

Included as part of the navigation system 10 is a drive 30 (or other suitable peripheral device) into which a data storage medium 32 can be installed. One or more geographic data sets 34 are stored on the storage medium 32. In one embodiment, the storage medium 32 is a CD-ROM disc. In another alternative embodiment, the storage medium 32 may be a PCMCIA card in which case the drive 30 would be substituted with a PCMCIA slot. Various other storage media may be used, including fixed or hard disks, DVD, or other currently available storage media, as well as storage media that may be developed in the future.

The navigation system 10 also includes a user interface 40 coupled to the CPU 26. The user interface 40 includes appropriate means for receiving input from an end user, as well as means for providing information back to the end user. For example, the user interface 40 may include an input panel or keyboard into which an end user may indicate a selection of a destination or a travel route. The user interface 40 may also include a display or speakers (including speech synthesis hardware and software) by which the user can be informed of navigation information. For visual navigation information, the user interface 40 may provide features allowing the user to zoom a display in or out of a particular geographic area to alternately display a larger geographic area or more detailed geographic information.

Although GPS 16 is shown in FIG. 1, the system 10 may employ any of several technologies to determine or approximate the end user's physical locations in a geographic region. For example, as an alternative or in addition to GPS, the system 10 may employ a dead reckoning-type system, LORAN C, or combinations of these, or other systems.

The navigation system 10 includes another data storage device 36 (ROM) which is used to store navigation application programs 38 and regular route application programs

39. Alternatively, the application programs 38 and 39 may be provided on the same storage device or medium 32 as the geographic data sets 34.

Although the regular route application programs 39 are shown as residing in the ROM 36 of the system 10, the regular route application programs 39 can be stored on any other suitable computer-usable medium for configuring the CPU 26 to perform the learning mode program and the operation mode program as disclosed herein. The computer-usable medium can be an article of manufacture for storing computer programs, such as a CD ROM, hard drive, DVD, diskette, solid-state memory such as a RAM, ROM, or EEPROM, or the like. Alternatively, the CPU 26 can be a custom hardware device, such as one or more application specific integrated circuits (ASIC) designed to perform the functions of either or both of the application programs 38–39, without relying on an external memory for storing software programs.

The navigation application programs 38 are a software programs that use the geographic data set 34 and the positioning system (e.g., GPS, when employed). The navigation application programs 38 provide various navigation features to the end user of the navigation system 10. These features may include route calculation functions, maneuver generation functions, map display functions, vehicle positioning functions, destination resolution capabilities, and so on. The navigation features are provided to the end user (e.g., the vehicle driver) by means of the user interface 40. The navigation and regular route application programs 38–39 may be written in a suitable computer programming language such as C, although other programming languages are also suitable.

During usage of the navigation system 10, one or more of the navigation application programs 38 are loaded from the ROM 36 into the memory 28 associated with the CPU 26. The programs 38 receive input from the user interface 40. The input may include a request for navigation information. The programs 38 also receive information from the positioning subsystem hardware and software 16–22. The information from the hardware/software 16–22 is used by the navigation applications 38 to determine the location, direction, speed, and the like, of the vehicle. The navigation applications 38 may provide the end user with a graphical display, e.g., a map, of the end user's specific location in the geographic region. In addition, the navigation application programs 38 may provide the end user with specific directions to locations in the geographic area from wherever the end user is located.

To provide these various navigation application features, the navigation system 10 uses the geographic data (geo DB) 34 stored on the storage medium 32, optionally in conjunction with the output from the positioning subsystem hardware/software 16–22. The geographic data 34 may be in the form of one or more computer-readable files or databases that enable the navigation application programs 38 to provide the supported features. For example, to enable the calculation of a route between two locations in the geographic region, the geographic data 34 may include route calculation data that includes the positions of roads and intersections in the geographic region, information about one-way streets, turn restrictions, stop signs, stop lights, speed limits, and so on.

When performing a map display function with the navigation system, the sizes, shapes, and relative positions of geographic features in a portion of a geographic region are portrayed on the display of the user interface 40. These geographic features may include roads, intersections, and points-of-interest, as well as other features, such as lakes, railroad tracks, buildings, airports, stadiums, parks, mountain ranges, docks, ferries, tunnels, bridges, and so on. To provide this map display function, the geographic data set 34 may include cartographic data which allow the navigation application program 38 to display maps illustrating the size, shape, position, and character of these various geographic features on the display.

Figure 2:
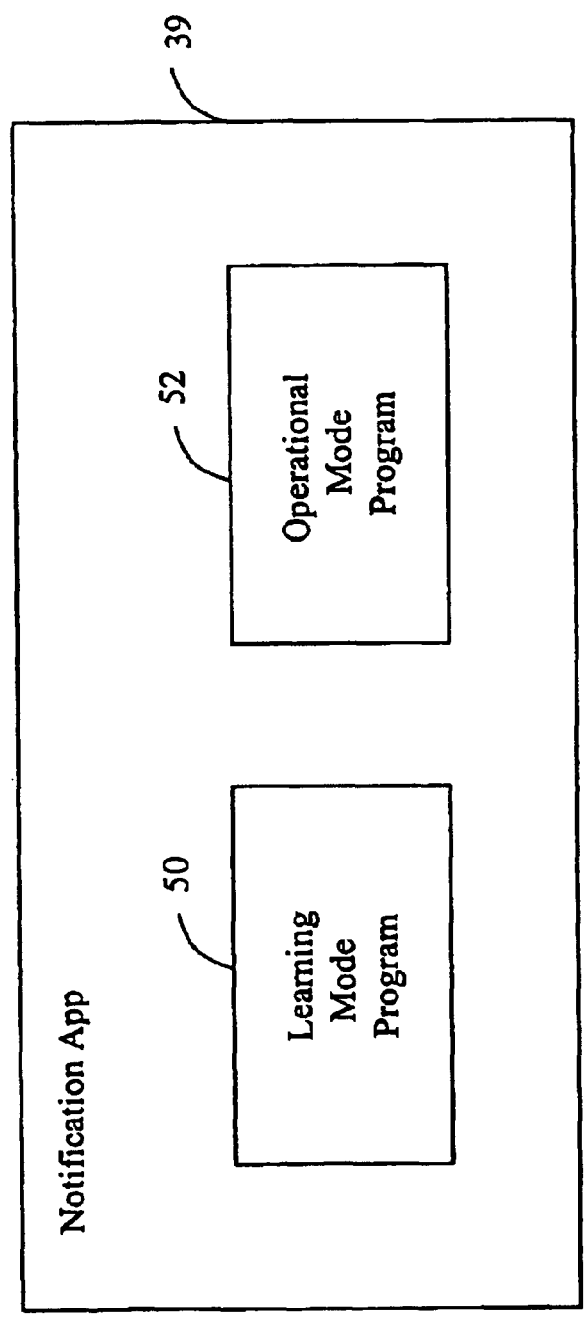
FIG. 2 is a block diagram illustrating the software programs included in the regular route application of FIG. 1.

As depicted in FIG. 2, the regular route application programs 39 are software programs that include a learning mode program 50 and an operational mode program 52. The learning mode program 50 identifies and records information regarding trips regularly taken by a vehicle and then populates the trip database 37 with records of routine trip information. (When used in reference to routes or trips, the terms "regular" and "routine" are used interchangeably herein). The recorded trip information can include trip departure times, origin points, destination points, dates of travel, days of travel, and route data.

The learning mode program 50 can be activated either manually or automatically. To activate the learning mode manually, an end user can employ the user interface 40 to enter a learn route command into the system 10. The learn route command causes the learning mode program 50 to record trip information and then store it as a routine trip record in the database 37. By entering the learn route command at the beginning of a trip, a driver can manually designate the trip as a routine trip and the system 10 will then record and store trip information, such as the departure time, origin and destination points, and traveled route. In addition, the driver can manually designate the trip as being either a primary or secondary route. The learn route command itself can be entered using any suitable computer-human interface included in the user interface 40, such as a touch screen, push button, keyboard, graphical user interface, or the like.

The automatic learning mode can be the system default, executing the learning mode program 50 in background during vehicle operation to identify and record regularly traveled routes without requiring end-user intervention. A method for automatically learning regular routes is described below in connection with FIG. 3.

When the vehicle begins a new trip, the operational mode program 52 determines whether the vehicle is engaging in a routine trip. This is accomplished by comparing current vehicle location or departure time information to routine trip information in the database 37. If the vehicle is starting a routine trip, the operational mode program 52 retrieves from the database 37 trip information stored in a trip record associated with the routine trip and provides one or more additional useful features using the routine trip information. One of these additional features includes accessing RTTI corresponding to the trip information and notifying an end user about traffic conditions indicated by the RTTI.

Figure 3:
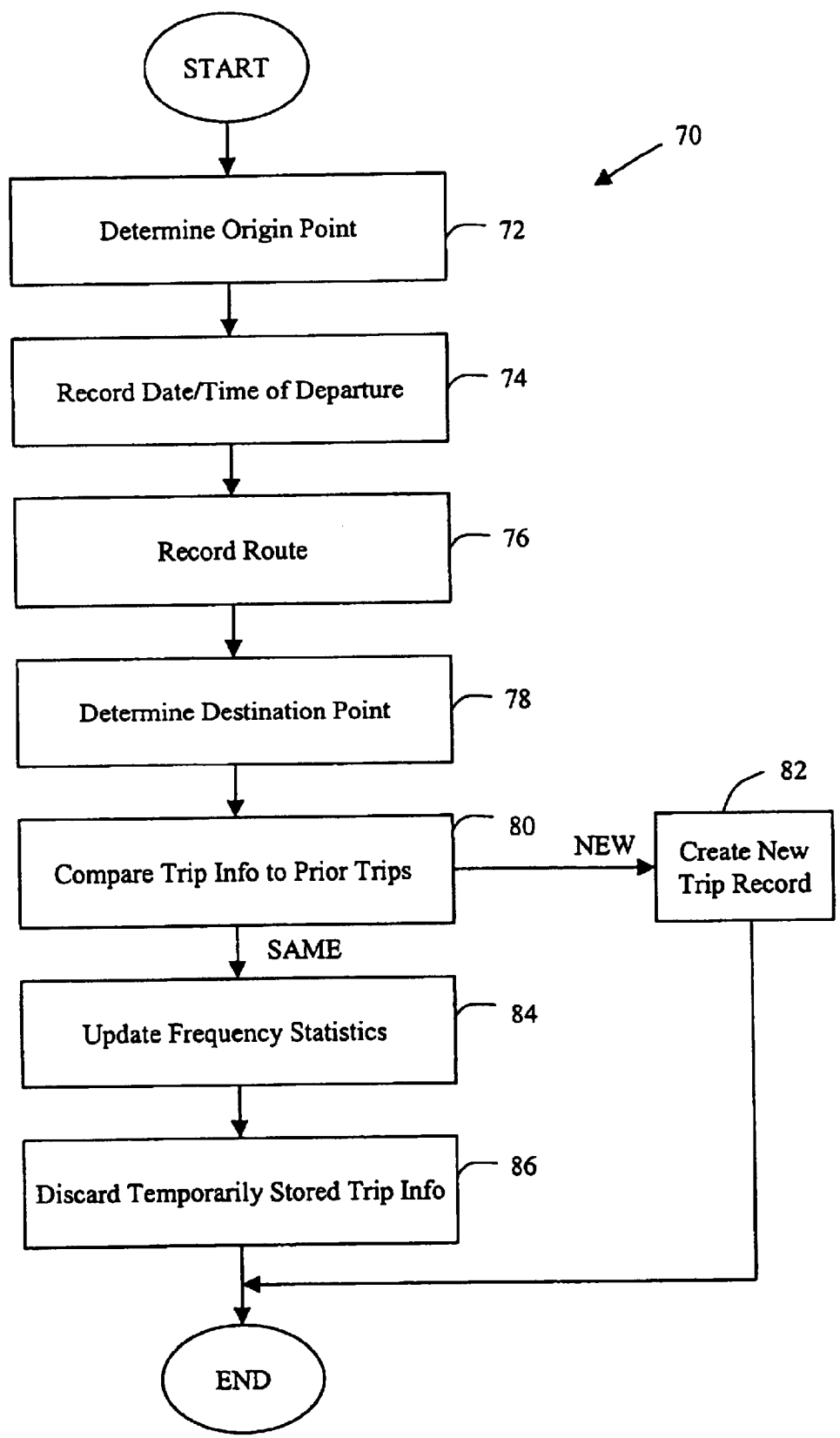
FIG. 3 is a flow chart diagram illustrating a process of learning regularly driven routes, which is performed by the learning mode program of FIG. 2.

FIG. 3 is a flow chart diagram 70 illustrating a method of automatically learning regularly (routinely) driven routes, which can be performed by the learning mode program 50. In step 72, the origin point of a trip about to be taken is determined. Generally, the origin point represents the physical starting location of a trip taken by a vehicle. The origin point can be determined using the positioning hardware and/or software 16–22 to determine the physical location of the vehicle when the vehicle enters an operational state from an off state. The origin point can be temporarily stored by the navigation system 10.

In step 74, the time of the trip departure is temporarily recorded. The date, day of week, and time of day can be recorded when the vehicle enters the operational state.

In step 76, the route taken by the driver is determined. This can be accomplished by monitoring and temporarily recording position data from the positioning hardware and/or software 16–22 during vehicle operation. The recorded position data can be compared to road segment data included in the geo DB 34 to determine roadways taken during a trip. Information identifying roadways taken during the trip can then be stored as route data.

In step 78, the destination point of the trip is determined. The destination point represents the physical location of the end point of a trip. The destination point can be determined using the positioning hardware and/or software 16–22 to determine the physical location of the vehicle when the vehicle has completed a trip. Indications that a trip has been completed include, but are not limited to, events such as the vehicle transitioning from the operational state to the off state, the vehicle being placed in park, the vehicle not moving for a predefined period of time, user input indicating the completion of a trip, or the like.

In step 80, a comparison is made between trip information stored in the trip database 37 and the temporarily stored information about the just completed trip. In particular, the comparison can be based on one or more of the origin point, destination point, time of departure, and route data, of the just completed trip. To make the comparison, range values can be established for the various data stored in the trip database 37. For example, a range distance can be established for the origin points stored in the database 37. If the origin point of the just completed trip falls within the range of a stored origin point of a routine trip, then a match is found. Range values and range comparisons can also be established and made for departure times and route data.

If the information regarding the just completed trip does not match a stored trip record, the just completed trip represents a new trip and a new trip record is created (step 82). The new trip record can be retained for a specified period of time. If an additional trip is not taken along the route during the period, the trip record may be discarded as not representing a regularly traveled route. However, if one or more additional trips are made along the route, the record may be kept, representing a regularly traveled route.

If the just completed trip information matches a stored trip record, the just completed trip is identified as a previously recorded route. In this case, route frequency statistics, such as days traveled, departure time and number of trips made on the route are updated (step 84). The learning mode program 50 can also identify primary and secondary routes between particular origin and destination points by comparing the frequency at which the routes are traveled. The most frequently traveled route is identified as the primary route.

In step 86, the temporarily stored trip information, such as the recorded route, the date/time of departure, origin and destination points, and the like, is discarded.

Figure 4:
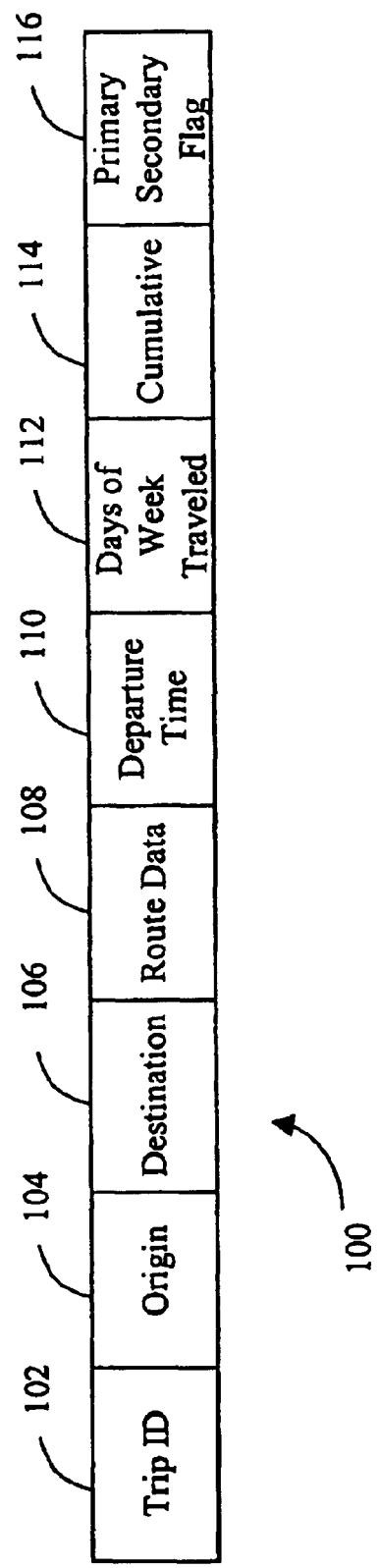
FIG. 4 illustrates an exemplary format for a trip record stored in the trip database of FIG. 1.

FIG. 4 illustrates an exemplary format of a trip record 100 stored in the trip database 37. The trip record 100 includes a trip identifier (ID) field 102, an origin field 104, a destination field 106, a route data field 108, a departure time field 110, a days of week traveled field 112, a cumulative field 114, and a primary/secondary flag 116.

The trip ID 102 can be a field for storing text or alphanumeric characters identifying the trip associated with the record. In addition, the trip ID 102 can include a driver identifier for associating the trip record with a particular end user. The departure time 124 can be a text field defining or storing the departure time. The origin 104 and the destination 106 are fields for storing location information for the beginning and ending points, respectively, of a trip. The route data 108 include information for defining a route between origin and destination points of the trip. The information can include data retrieved from the geo DB 34. The days of week traveled field 112 can indicate the days that the route has been traveled in the past. This field 112 is useful for identifying routine trips, such as work or school trips, which occur on particular days of the week, such as Monday through Friday.

The cumulative field 114 can indicate the total number of times the trip has been taken. The number of times a trip has been taken can be represented using an exact count, or ranges of times, i.e., 1000–2000, 2001–3000, and so on.

The primary/secondary flag 116 indicates whether the recorded trip information represents a primary route or a secondary route. As discussed above, primary and secondary routes connect the same origin and destination points, with primary routes being more frequently traveled than secondary routes. There can be one or more secondary routes associated with a particular set of origin and destination points. The flag 116 can be determined based on the values stored in cumulative fields 114. Alternatively, the flag 116 can be manually set by an end user through the user interface 40. With the user interface 40, an end user can enter a command to designate a route as primary or secondary.

Figure 5:
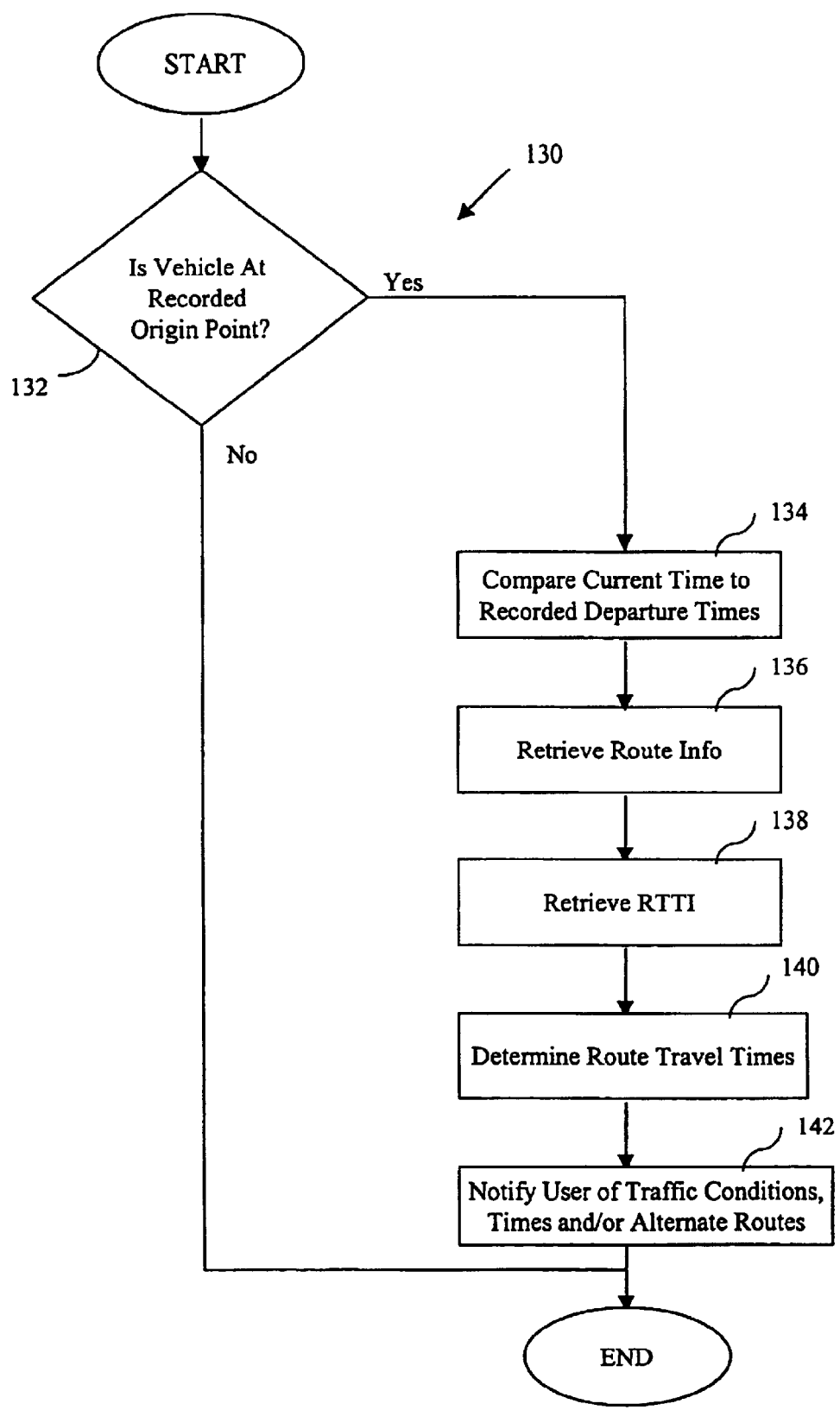
FIG. 5 is a flow chart diagram illustrating a process of automatically notifying an end user about traffic conditions, which is performed by the operational mode program shown in FIG. 2.

FIG. 5 shows a flow chart diagram 130 illustrating details of the operational mode program 52. In the operational mode, the navigation system first determines whether or not the vehicle is traveling on a routine trip. If the vehicle is on a routine trip, the system 10 provides one or more additional useful features. One additional useful feature is a traffic watch feature. According to this feature, when the operational mode program 52 determines that the vehicle is on a routine route, it checks traffic conditions along the route and notifies the driver of predicted travel times, traffic conditions and incidents, and/or alternative routes. This overall process is accomplished as follows.

In step 132, a check is made to determine whether the vehicle is at the origin point of a recorded routine trip. If the vehicle is not at or near a previously recorded origin point of a routine trip, the system 10 determines that the vehicle is not engaging in a routinely traveled trip. However, if the vehicle is at or near a recorded origin point, the system 10 determines that the vehicle is about to make a routine trip.

In some situations, a recorded origin point may correspond to multiple routinely traveled trips. For example, a recorded origin point may correspond to a traveler's home. Routine trips starting from the traveler's home could include trips to work, trips to school, shopping trips, and so on. To help determine which routine trip is being taken, a comparison can be made between the current time and recorded departure times corresponding to the recorded origin point. The routine trips associated with the current time and origin point can then be listed, permitting the end user to select trips about to be taken.

After the operational mode program 52 determines that the vehicle is on a routine trip, one or more additional useful features are provided. As mentioned above, one of these additional useful features is a traffic watch feature whereby the traffic conditions along the routine route are automatically checked for the driver. To check traffic conditions, the system 10 first retrieves route information corresponding to the trip (step 136). Next, in step 138, the system 10 retrieves real time traffic information (RTTI) using the RTTI receiver 14. With the RTTI, the system 10 then determines route travel times for each route connecting the destination and origin points of the trip (step 140). The RTTI can be traffic congestion information. One way to gather this information is by using sensors placed on the roadways to measure traffic flow. Such RTTI is publicly available from various state and local government agencies. For example, the Illinois Department of Transportation (IDOT) provides road segment travel time information at a publicly accessible website. Such information can be used by the operational mode program 52 to update the current travel time for routes stored in the trip database 37 or those routes currently being traveled. The operational mode program 52 can compute route travel times by downloading the publicly available traffic information and converting it into a format consistent with the road segments stored for each trip in the trip database 37. Alternatively, already converted traffic information can be downloaded from either private or public sources if available.

In step 142, the user is notified, using the user interface 40, of traffic conditions, traffic incidents, travel times and/or alternate routes corresponding to the trip about to be taken. The system 10 can notify the user of the route with the fastest travel time if more than one route (i.e., primary and secondary routes) has been recorded for a particular origin/destination point pair. Alternatively, a threshold comparison can be made to determine whether current travel times for recorded routes for an origin/destination point pair are excessive. If the travel times are excessive, then an alternative route can be determined and presented to the user. For example, if route travel times for a regularly traveled trip are fifty percent longer than normal, the system 10 can alert the user and provide an alternative route, one that is not currently recorded in the trip database 37.

To determine an alternative route, a route calculation program can be used. The route calculation program can determine route travel times and automatically select best routes based on trip origin and destination points, as well as information contained in the geo DB 34 or RTTI. The geo DB 34 stores road information organized as a plurality of road segments. The road segments contain computer-usable information describing roadways, such as geographic location, addresses and traffic control devices along the segment, and estimated travel time. One method available for performing route calculations is disclosed in co-pending U.S. patent application Ser. No. 09/047,698, which is hereby incorporated by reference.

The routes determined by the route calculation program can be compared to those recorded for the trip to ensure that the alternative route is not the same as one already recorded for the trip.

In addition, the system 10 can monitor RTTI while the user is traveling on a particular route to notify the user of any traffic incidences, such as accidents, along the route. If a traffic incident is detected, an alternative route can be selected from the recorded routes or determined using the route calculation program.

As mentioned above, by having the capability to recognize routine routes, the navigation system can provide various additional useful features. The traffic watch feature, mentioned above, is one of these features. Another of these features is a trip-logging feature. According to this feature, a user is able to download from the trips database 37 a log of all the routine trips that the user has taken with the vehicle over a period of time. This information can be used for keeping track of certain kinds of trips. For example, using the logging feature, the end user can determine the number of business trips and the mileage of these for tax purposes or for reimbursement. Similarly, using the logging feature, the end user can determine the medical-related trips for insurance and tax deduction purposes.

According to another feature, a user can use the routine routes data from the trips database for a driving profile analysis program. The driving profile analysis program analyzes the user's driving patterns and suggests possible ways that the user can save time or money. For example, the driving profile analysis may determine that if the user is able to leave one-half hour later for certain a certain routine trip, an overall savings of travel time can be obtained. Alternatively, the driving profile analysis may suggest that certain routine trips be combined, if possible, to reduce overall time and expense spent driving.

According to another feature, the end user can be informed about special sales or promotions along the routine routes. For example, a restaurant may have a promotion for motorists who routinely drive past its location. Alternatively, a department store located on an end user's routine route may have a special sale promotion. The user can be informed of this special sale promotion in the same manner as he/she is informed about traffic.

The system 10 can be "personalized" for individual end users, i.e., it can be configured to record and maintain routine trip data, as well as provide features, on a per user basis. The personalization capability of the system 10 is useful in situations where multiple drivers use the same vehicle. In such situations, the learning mode program 50 can be configured to generate and store trip records that are associated with respective end users.

The operational mode program 52 can likewise perform its functions on a per user basis, checking conditions and providing notification for those routes corresponding to the particular end user operating the vehicle.

To provide system personalization, the user interface 40 can include a user identification interface that permits drivers to enter a user ID and/or password that is then used by the system 10 to identify trip records and features corresponding to the driver. User profiles can also be entered by the driver and stored by the system 10. These profiles identify system features selected by the end users. In addition to or as an alternative to entering user IDs, the system 10 can monitor characteristics of the vehicle to automatically determine the identity of the driver. For example, the system 10 can include an interface to an electric driver seat memory for determining the driver seat position. Based on the seat position, the system 10 can be personalized for the current driver.

The learning mode or operational mode programs 50–52 can include software code for determining and using the driver identity.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method of facilitating operation of a navigation system located in a vehicle traveling in a geographic region comprising:

storing data that represent multiple routes actually traveled by the vehicle, whereas the multiple routes include routes between one origin and multiple destinations;

counting a number of times the vehicle travels one of the multiple routes;

storing data indicating said number of times; and at a time subsequent to when the data indicating the multiple routes have been stored, if the number of times one of the multiple routes has been traveled is greater than a predetermined number, providing to an end user information corresponding to a business proximate the one of the multiple routes.

2. The method of claim 1 wherein the information is an advertisement.

3. The method of claim 1 further comprising:

obtaining real time traffic data that pertain to the current trip; and calculating a travel time for the current trip based on the real time traffic data.

4. The method of claim 1 further comprising:

calculating an alternative route to the destination, wherein the alternative route is different from the multiple routes.

5. The method of claim 1 wherein the information is a sales promotion.

6. The method of claim 1 wherein the business is a store.

7. The method of claim 1 wherein the business is a restaurant.

8. A method of facilitating operation of a navigation system located in a vehicle traveling in a geographic region comprising:

storing data that represent multiple routes actually traveled by the vehicle, whereas the multiple routes include routes between one origin and multiple destinations;

counting a number of times the vehicle travels one of the multiple routes;

storing data indicating said number of times;

at a time subsequent to when the data indicating the multiple routes have been stored, determining that the vehicle is traveling on a current trip to one of the destinations along one of the multiple routes; and providing to an end user information corresponding to a point of interest proximate the one of the multiple mutes on which the current trip is traveling.

9. A method of facilitating operation of a navigation system located in a vehicle traveling in a geographic region comprising:

storing data that represent multiple routes actually traveled by the vehicle, whereas the multiple routes include routes between one origin and multiple destinations, and whereas the data for each of the multiple routes indicate the number of times the route has been traveled;

at a time subsequent to when the data indicating the multiple routes have been stored, determining that the vehicle is traveling on a current trip along one of the multiple routes; and if the number of times said one of the multiple routes on which the current trip is traveling has been traveled is greater than a predetermined number, providing to an end user information corresponding to a point of interest proximate said one of the multiple routes on which the current trip is traveling.

10. The method of claim 9 wherein the information is an advertisement.

11. The method of claim 9 wherein the step of determining further comprises:

identifying a current trip departure time; and comparing the current trip departure time to a departure time associated with each of the multiple routes.

12. The method of claim 9 wherein the step of determining further comprises:

identifying a current trip destination; and comparing the current trip destination to a destination associated with each of the multiple routes.

13. The method of claim 9 wherein the step of determining further comprises:

identifying an identity of a current driver of the vehicle; and comparing the identity of the current driver to a driver identity associated with each of the multiple routes.

14. The method of claim 9 further comprising:

obtaining real time traffic data that pertain to the current trip; and calculating a travel time for the current trip based on the real time traffic data.

15. The method of claim 9 further comprising:

calculating an alternative route to the destination, wherein the alternative route is different from the multiple routes.

16. A method of facilitating operation of a navigation system located in a vehicle traveling in a geographic region comprising:

storing data that represent a route between an origin and a destination;

counting a number of times the vehicle travels the route;

storing data indicating said number of times; and at a time subsequent to when the data indicating the route have been stored, if the number of times said route has been traveled is greater than a predetermined number, providing to an end user information corresponding to a facility proximate the route.

17. The method of claim 16 wherein the information is an advertisement.

18. The method of claim 16 further comprising:

calculating an alternative route to a destination of the current trip, wherein the alternative route is different from the routinely-traveled route.

19. The method of claim 16 wherein the facility is a store.

20. The method of claim 16 wherein the facility is a restaurant.

21. A method of operating a navigation system comprising:

storing data that represent multiple routes actually traveled by the navigation system, wherein data for each of the multiple routes indicate a number of times the route has been traveled; and at a time subsequent to when the data indicating the multiple routes have been stored, if the number of times one of the multiple routes has been traveled is greater than a predetermined number, providing to an end user information corresponding to a point of interest proximate the one of the multiple routes.

22. The method of claim 21 wherein said multiple routes are routinely-traveled routes.

23. The method of claim 21 further comprising:

determining that the vehicle is traveling on a current trip along one of the multiple routes.

24. The method of claim 21 wherein the information is an advertisement.

* * * * *